US010906498B2

(12) United States Patent
Özyürek et al.

(10) Patent No.: US 10,906,498 B2
(45) Date of Patent: Feb. 2, 2021

(54) GAS GENERATOR SUPPORT FOR ATTACHING A GAS GENERATOR OF A VEHICLE OCCUPANT RESTRAINT SYSTEM TO A VEHICLE STRUCTURE

(71) Applicant: Joyson Safety Systems Germany GmbH, Aschaffenburg (DE)

(72) Inventors: Baki Özyürek, Ulm (DE); Alexander Aulbach, Aschaffenburg (DE); Wolfgang Siegel, Sontheim/Brenz (DE); Thomas Reichenbecher, Ulm (DE)

(73) Assignee: Joyson Safety Systems Germany GMBH, Aschaffenburg (DE)

( * ) Notice: Subject to any disclaimer, the term of this patent is extended or adjusted under 35 U.S.C. 154(b) by 163 days.

(21) Appl. No.: 16/121,889

(22) Filed: Sep. 5, 2018

(65) Prior Publication Data
US 2019/0071045 A1 Mar. 7, 2019

(30) Foreign Application Priority Data

Sep. 5, 2017 (DE) .......................... 10 2017 215 577

(51) Int. Cl.
*B60R 21/217* (2011.01)
*B60R 21/26* (2011.01)

(52) U.S. Cl.
CPC .......... *B60R 21/2171* (2013.01); *B60R 21/26* (2013.01)

(58) Field of Classification Search
CPC .............................. B60R 21/2171; B60R 21/26
See application file for complete search history.

(56) References Cited

U.S. PATENT DOCUMENTS

| 8,007,000 | B2 | 8/2011 | Gammill et al. |
| 8,141,898 | B2* | 3/2012 | Hamels ............... B60R 21/2171 |
| | | | 280/728.2 |
| 8,226,113 | B2* | 7/2012 | Yamashita .......... B60R 21/2171 |
| | | | 280/728.2 |
| 8,764,051 | B2 | 7/2014 | Fischer |
| 10,315,604 | B2* | 6/2019 | Terbu ................. B60R 21/2171 |
| 2002/0084630 | A1 | 7/2002 | Aulbach |

FOREIGN PATENT DOCUMENTS

| DE | 100 29 817 A1 | 1/2002 |
| DE | 101 53 861 A1 | 6/2002 |
| DE | 10 2008 010 863 A1 | 8/2009 |
| DE | 10 2009 015 337 A1 | 9/2010 |
| DE | 10 2011 100 031 A1 | 10/2012 |
| DE | 10 2013 010 920 A1 | 1/2015 |
| EP | 1 216 895 B1 | 12/2005 |
| WO | WO 2011/085167 A1 | 7/2011 |
| WO | WO 2012/072152 A1 | 6/2012 |

* cited by examiner

*Primary Examiner* — Faye M Fleming
(74) *Attorney, Agent, or Firm* — Gordon Rees Scully; Mansukhani, LLP

(57) ABSTRACT

It is provided a gas generator support for attaching a gas generator of a vehicle occupant restraint system to a vehicle structure, comprising a receiving region for the gas generator as well as a first and a second fastening region, via which the gas generator support can be attached to the vehicle structure. The gas generator support is twisted about a longitudinal axis such that after attaching the first fastening region to the vehicle structure the second fastening region is pretensioned against the vehicle structure and with at least one abutment portion clampingly rests against the vehicle structure.

15 Claims, 5 Drawing Sheets

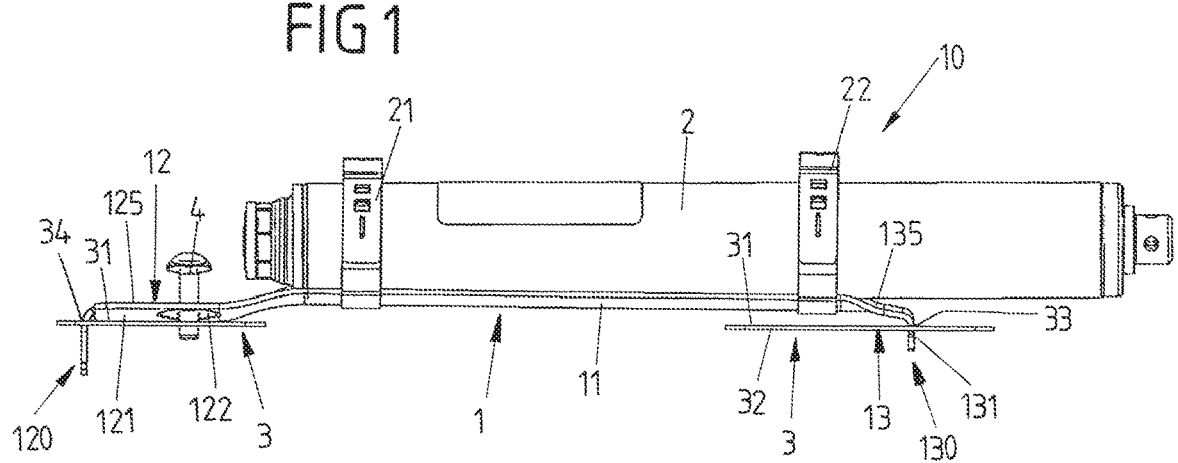
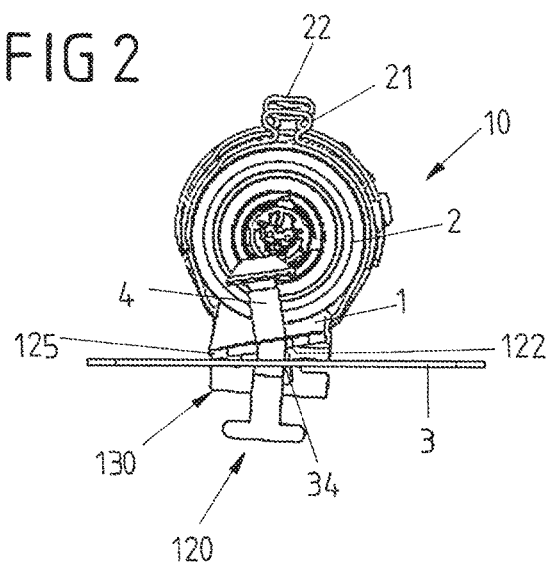
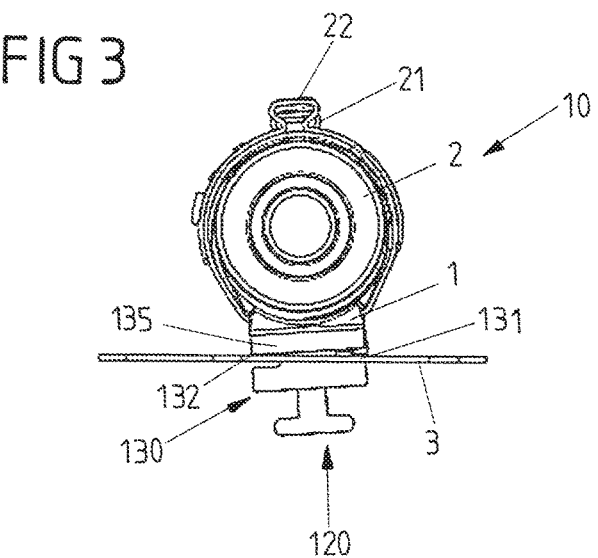

GAS GENERATOR SUPPORT FOR ATTACHING A GAS GENERATOR OF A VEHICLE OCCUPANT RESTRAINT SYSTEM TO A VEHICLE STRUCTURE

REFERENCE TO RELATED APPLICATION

This application claims priority to German Patent Application No. 10 2017 215 577.9 filed on Sep. 5, 2017, the entirety of which is incorporated by reference herein.

BACKGROUND

This invention relates to a gas generator support for attaching a gas generator of a vehicle occupant restraint system to a vehicle structure.

Such gas generator supports serve for the positioning and attachment of a gas generator or a gas bag module in a vehicle. The gas generator in particular is fixed at the gas generator support, wherein the gas generator support in turn is attached (e.g. screwed) to a vehicle structure, as this is disclosed e.g. in DE 10 2008 010 863 A1. The attachment of the gas generator support to the vehicle structure in particular is effected such that a movement (in particular in the form of vibrations) of the gas generator support relative to the vehicle structure and hence a generation of noises (such as rattling noises) is prevented. The construction of the previously known gas generator supports, however, is complex.

SUMMARY

A problem underlying the invention consists in creating a gas generator support that can be manufactured in the easiest possible way and can be attached free from vibrations as far as possible.

This problem is solved by providing the gas generator support with features as described herein.

Accordingly, there is provided a gas generator support for attaching a gas generator of a vehicle occupant restraint system to a vehicle structure, comprising
- a receiving region for the gas generator;
- a first and a second fastening region, via which the gas generator support can be attached to the vehicle structure, wherein
- the gas generator support is twisted about a longitudinal axis (of the gas generator support) such that after attaching the first fastening region to the vehicle structure the second fastening region is pretensioned against the vehicle structure and with at least one abutment portion clampingly rests against the vehicle structure.

Due to the torsion of the gas generator support, a pretension of the gas generator support with respect to the vehicle structure can be produced when mounting the gas generator support on the vehicle structure. This pretension provides for an attachment of the gas generator support free from vibrations as far as possible, so that a generation of noise is counteracted. The gas generator support in particular is twisted in itself, so to speak, so that when attaching the one fastening region to the vehicle structure a pretension of the other fastening region relative to the vehicle structure is obtained.

It is conceivable that the gas generator support is twisted such that the first and the second fastening region, with regard to the condition of the gas generator support prior to assembly, are oriented in a manner twisted relative to each other (with respect to the longitudinal axis of the gas generator support). For example, an underside or a main plane of extension to be facing the vehicle structure, along which the underside extends, of the first fastening region is twisted with respect to an underside (in particular its main plane of extension) of the second fastening region.

It is also possible that the first and/or second fastening region is twisted with respect to a receiving surface of the receiving region, on which the gas generator is to be arranged, about a longitudinal axis of the gas generator support.

The abutment portion can clampingly rest against a side facing the receiving region (i.e. the upper side) or against a side (i.e. the underside) of the vehicle structure facing away from the receiving region (i.e. the gas generator to be attached to the gas generator support). For example, the abutment portion is formed by a hook portion of the second fastening region, wherein the hook portion—in the mounted condition of the gas generator support—reaches through an opening of the vehicle structure.

For example, the first fastening region includes an abutment portion with which it rests against an upper side of the vehicle structure in the mounted condition, and the second fastening region includes an abutment portion with which it rests against the upper side or an underside of the vehicle structure, wherein due to the torsion of the gas generator support, with regard to the condition prior to assembly, the abutment portion of the first fastening region is oriented in a manner rotated with respect to the abutment portion of the second fastening region. In the non-mounted condition of the gas generator support, the (at least one) abutment portion of the first fastening region hence extends in a plane that is oriented at an angle to a plane along which the (at least one) abutment portion of the second fastening region extends.

The abutment portion is formed e.g. line-shaped or flat.

Of course, several abutment portions can also be present. For example, the second fastening region can include a first abutment portion with which it clampingly rests against the upper side of the vehicle structure, and a second abutment portion with which it clampingly rests against the underside of the vehicle structure.

It is also possible that the first fastening region includes a hook portion with which it can reach through an opening of the vehicle structure.

The first fastening region in particular forms a first end region of the gas generator support and the second fastening region forms a second end region of the gas generator support.

The gas generator support according to the invention in particular is formed in one piece, e.g. from a metal or a plastic material.

The invention also relates to a gas generator assembly with a gas generator for inflating a gas bag of a vehicle occupant restraint system and a gas generator support configured as described above, on which the gas generator is arranged.

The gas generator in particular is fixed to the gas generator support, for example by means of at least one clamp or some other clamping element on the receiving region of the gas generator support.

BRIEF DESCRIPTION OF THE DRAWINGS

The invention will be explained in detail below by means of exemplary embodiments with reference to the Figures, in which:

FIG. 1 shows a side view of a gas generator assembly with a gas generator support according to an exemplary embodiment of the invention.

FIG. 2 shows a front view of the gas generator assembly of FIG. 1.

FIG. 3 shows a rear view of the gas generator assembly of FIG. 1.

DETAILED DESCRIPTION

Figure 4:
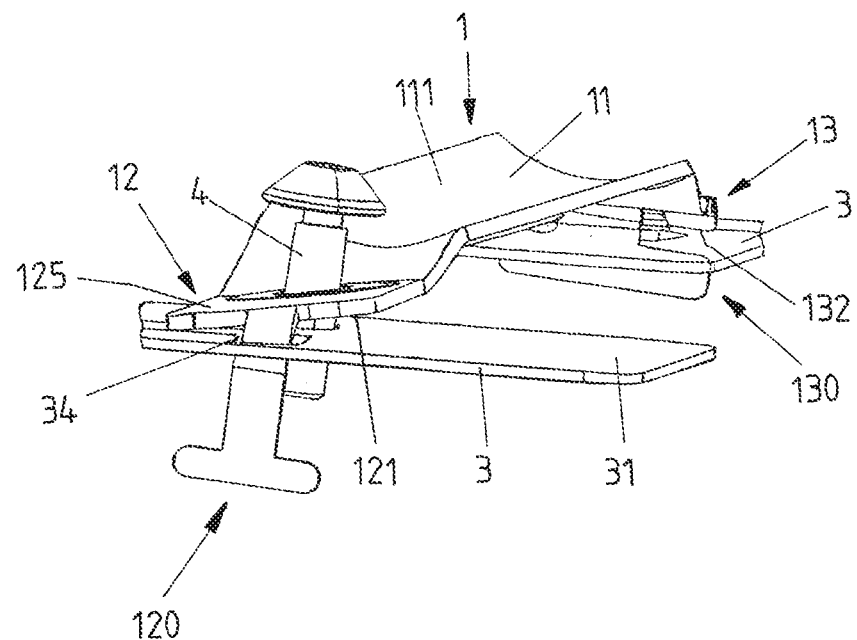
FIG. 4 shows the gas generator support of FIG. 1 before being mounted on a vehicle structure.
Figure 5:
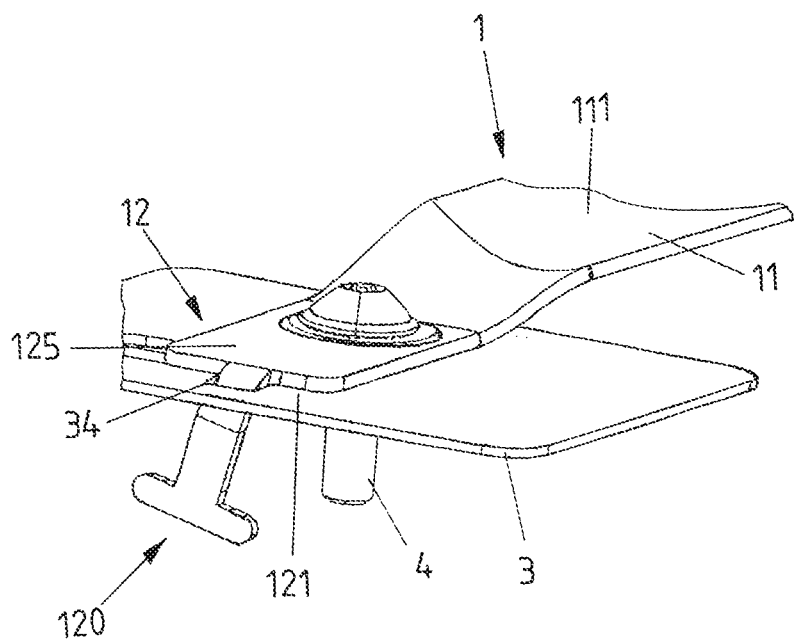
FIG. 5 shows the gas generator support of FIG. 1 after being mounted on a vehicle structure.
Figure 6:
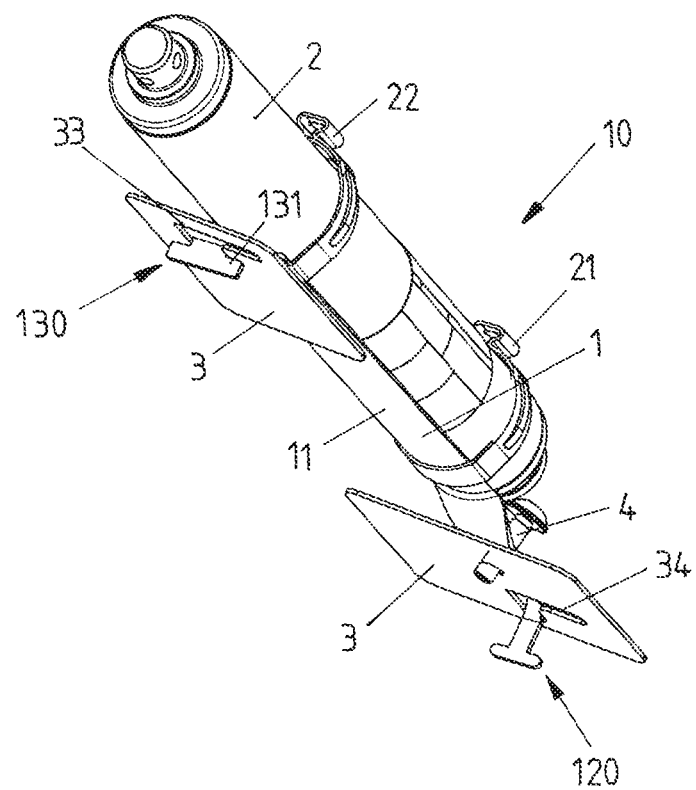
FIGS. 6 to 8 show perspective views of the gas generator assembly of FIG. 1.
Figure 7:
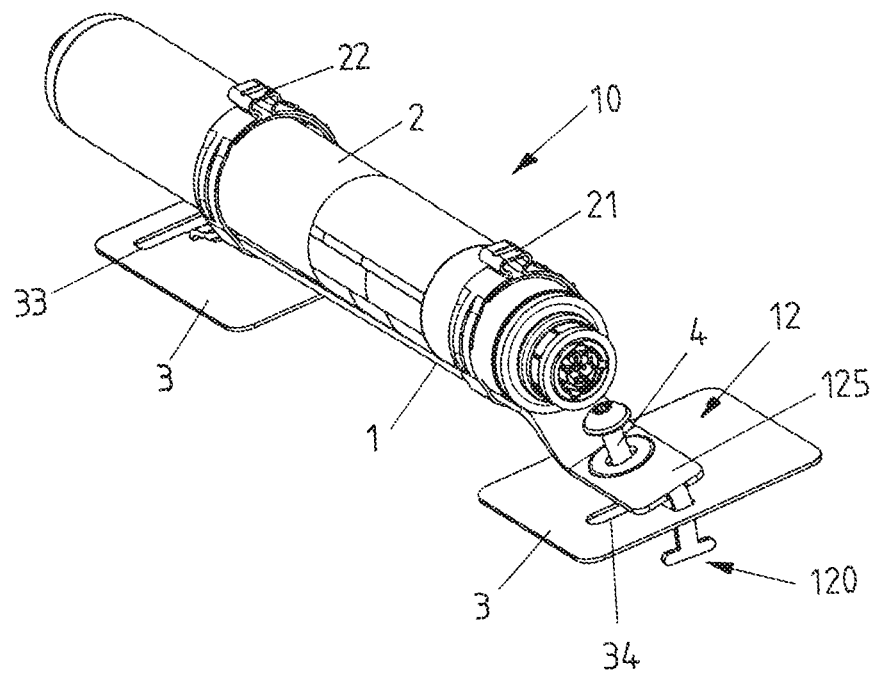
Figure 8:
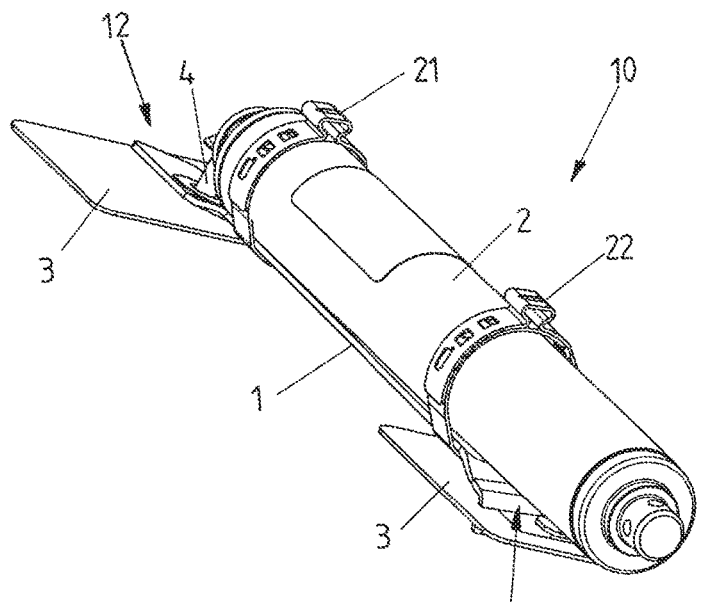

The gas generator assembly 10 shown in FIGS. 1 to 3 comprises a gas generator support 1 on which a gas generator 2 for inflating a gas bag (not shown) of a vehicle occupant restraint system is arranged. The gas generator 2 is attached to a receiving region 11 of the gas generator support 1 and at least sectionally rests against a curved receiving surface 111 adapted to the shape of a housing of the gas generator 2 (FIGS. 4 and 5). The attachment of the gas generator support 1 to the receiving region 11 is effected by means of two clamps 21, 22.

The gas generator support 1 includes a first and a second fastening region 12, 13, via which the gas generator support 1 and hence the gas generator 2 can be attached to a vehicle structure 3. The fastening regions 12, 13 each form an end portion of the (oblong) gas generator support 1. The gas generator support 1 in addition is rotated (twisted) about its longitudinal axis such that before being mounted on the vehicle structure 3 the first fastening region 12 (as shown in FIGS. 1 to 3) is oriented in a manner rotated with respect to the second fastening region 13.

In particular, the first fastening region 12 includes an abutment portion 121 with which it will come to rest against an upper side 31 of the vehicle structure 3 (facing the receiving region 11). The second fastening region 13 comprises a lower abutment portion 131 with which it will at least partly rest against an underside 32 of the vehicle structure 3 (facing away from the receiving region 11) after the assembly due to the torsion of the gas generator support 1. The gas generator support 1 is twisted such that the planes along which the abutment portions 121, 131 extend are oriented at an angle to each other. In addition, the second fastening region 13 includes a further (upper) abutment portion 132 (cf. in particular FIG. 4) with which it comes to rest against the upper side 31 of the vehicle structure 3.

The abutment portion 131 is formed by an upper edge portion of a hook element 130, wherein the hook element 130 reaches through an opening 33 of the vehicle structure 3. The hook element 130 protrudes downwards at an angle from a base portion 135 of the second fastening region 13. In addition, the first fastening region 12 also includes a hook element 120 that protrudes from a base portion 135 of the first fastening region 12 and reaches through a further opening 34 of the vehicle structure 3. The abutment portion 121 is formed by an underside of the base portion 135.

The openings 33, 34 of the vehicle structure 3 in particular are L-shaped. It is of course also conceivable that the openings 33, 34 are not L-shaped, but have another shape that in particular is designed such (e.g. funnel-shaped) that in an end position the hook elements 120, 130 engage behind a portion of the vehicle structure 3.

The first fastening region 12 is fixed to the vehicle structure 3 via a fastening element in the form of a screw 4, wherein in the first fastening region 12 an attachment opening 122 is formed, through which the screw 4 can extend into an attachment opening of the vehicle structure 3; cf. in particular FIG. 4.

Tightening of the screw 4 effects a rotation of the gas generator support 1, until the abutment portion 121 of the first fastening region 12 extends parallel to the upper side 31 of the vehicle structure 3 and rests against the upper side 31, as this is shown in FIG. 5. At the same time, due to the rotation of the gas generator support 1 the abutment portion 131 of the second fastening region 13 is pressed against the underside 32 of the vehicle structure 3, namely such that in the mounted condition of the gas generator support 1 (i.e. after tightening the screw 4) it is clampingly pretensioned against the vehicle structure 3. This pretension prevents a relative movement of the gas generator support 1 with respect to the vehicle structure 3 or at least counteracts such a relative movement. The hook element 120 of the first fastening region 12 can have a cutout 125 in its upper region, so that the upper region of the hook element 120, which in the mounted condition of the gas generator support 1 is located in the region of the opening 34, is narrower than the lower region. With the cutout 125 it is avoided that during the rotation of the gas generator support 1 the hook element 120 abuts against an edge of the opening 34 and blocks the rotation of the gas generator support 1.

The abutment portions 121, 131, 132 with which the first and the second fastening region 12, 13 each come to rest against the vehicle structure 3 in principle can be designed in any way, e.g. line-shaped or flat. Examples for configurations of the abutment portions 131, 132 of the second fastening region 13 are shown in FIGS. 9 to 14.

Figure 9:
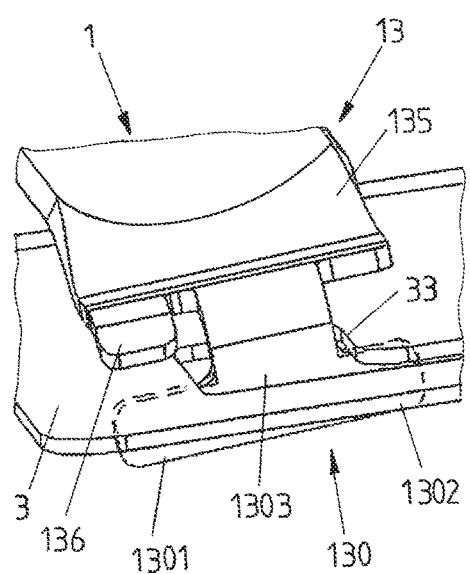
FIGS. 9 to 14 show modifications of the gas generator support of the gas generator assembly of FIG. 1.
Figure 10:
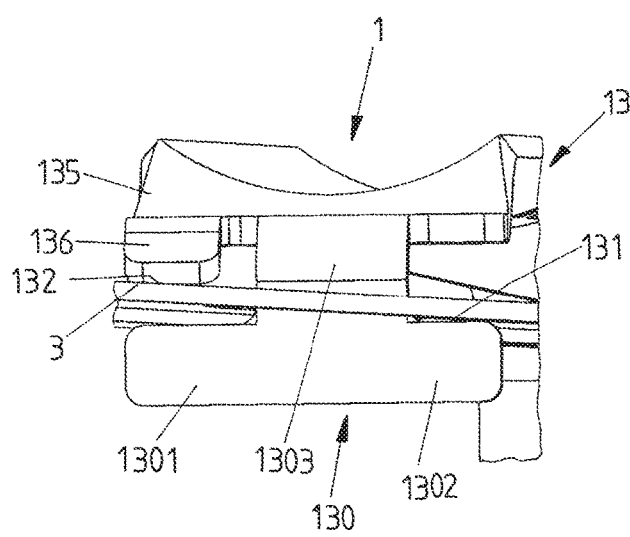
Figure 11:
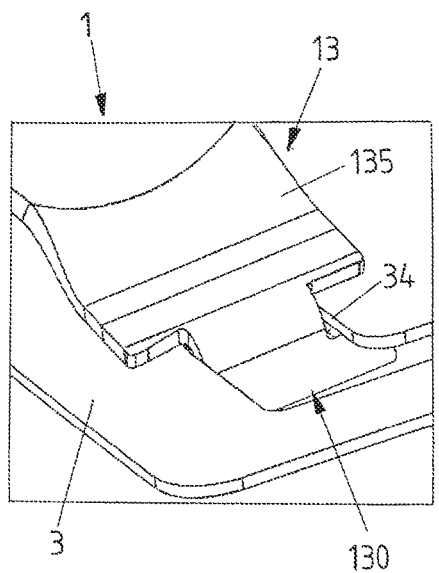
Figure 12:
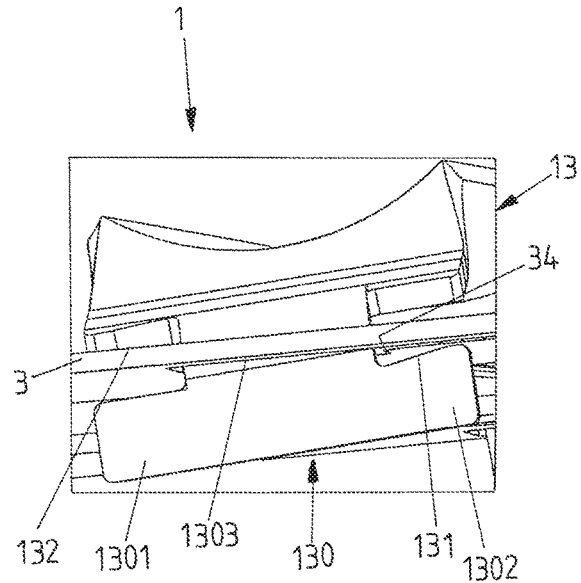
Figure 13:
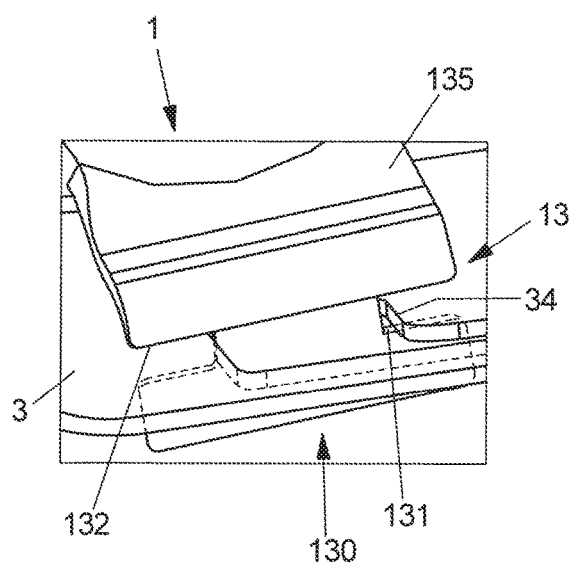
Figure 14:
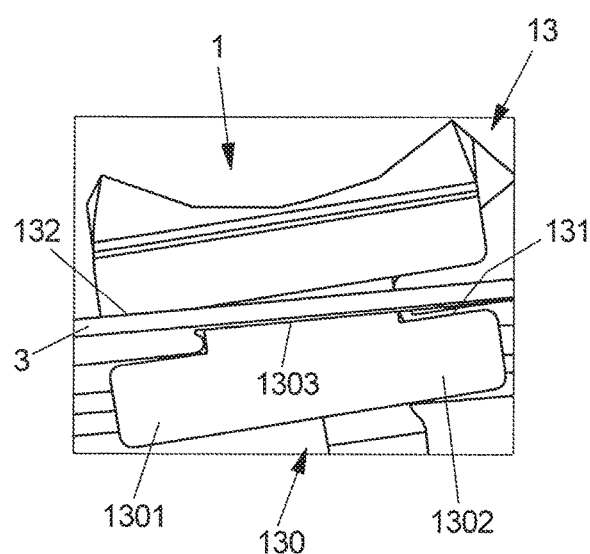

For example, the hook element 130 can include two lateral elements 1301, 1302 which protrude from a central part 1303. The gas generator support 1 can be configured such that in the mounted condition of the gas generator support 1 only one of the lateral elements (the element 1302) gets in contact with the vehicle structure 3. Thus, an upper edge side of the lateral element 1302 only forms the lower abutment portion 131. Furthermore, the second fastening region 13 can include a protrusion 136 protruding from the base portion 135, which in the mounted condition of the gas generator support 1 rests against the upper side 31 of the vehicle structure 3 with a section of its underside forming the abutment portion 132. In addition, the upper abutment portion 132 here can be located in front of the lower abutment portion 131 along the longitudinal direction of the gas generator support 1, i.e. have a larger distance from the first fastening region 12 than the lower abutment portion 131 (FIGS. 9 and 10).

It is also conceivable, however, that the lower abutment portion 131 is located in front of the upper abutment portion 132 (FIGS. 11 and 12) or the abutment portions 131, 132 at least approximately have the same position in longitudinal direction of the gas generator support 1, i.e. are arranged at the same distance from the first fastening region 12.

The invention claimed is:

1. A gas generator support for attaching a gas generator of a vehicle occupant restraint system to a vehicle structure, comprising
   a receiving region for the gas generator;
   a first and a second fastening region, via which the gas generator support can be attached to the vehicle structure, wherein
   the gas generator support is twisted about a longitudinal axis such that due to the torsion after attaching the first fastening region to the vehicle structure the second fastening region is pretensioned against the vehicle structure and with at least one abutment portion clampingly rests against the vehicle structure.

2. The gas generator support according to claim 1, wherein the gas generator support is twisted such that with regard to the condition of the gas generator support prior to assembly, the first and the second fastening region are oriented in a manner rotated relative to each other about a longitudinal axis of the gas generator support.

3. The gas generator support according to claim 1, wherein with regard to the condition of the gas generator support prior to assembly, the first and/or second fastening region is rotated with respect to a receiving surface of the receiving region, on which the gas generator is to be arranged, about a longitudinal axis of the gas generator support.

4. The gas generator support according to claim 1, wherein the abutment portion clampingly rests against an upper side of the vehicle structure.

5. The gas generator support according to claim 1, wherein the abutment portion clampingly rests against an underside of the vehicle structure.

6. The gas generator support according to claim 5, wherein the abutment portion is formed by a hook element of the second fastening region, wherein the hook element can reach through an opening of the vehicle structure.

7. The gas generator support according to claim 1, wherein the first fastening region includes an abutment portion with which it rests against an upper side of the vehicle structure in the mounted condition of the gas generator support, and the second fastening region includes an abutment portion with which it rests against the upper side or an underside of the vehicle structure, wherein due to the torsion of the gas generator support, with regard to the condition prior to assembly, the abutment portion of the first fastening region is oriented in a manner rotated with respect to the abutment portion of the second fastening region.

8. The gas generator support according to claim 1, wherein the abutment portion is formed line-shaped or flat.

9. The gas generator support according to claim 1, wherein the second fastening region includes a first abutment portion, with which it clampingly rests against an upper side of the vehicle structure, and a second abutment portion, with which it clampingly rests against an underside of the vehicle structure.

10. The gas generator support according to claim 1, wherein the first fastening region includes at least one attachment opening through which a fastening element can be guided for attaching the first fastening region to the vehicle structure.

11. The gas generator support according to claim 1, wherein the first fastening region includes a hook element with which it can reach through an opening of the vehicle structure.

12. The gas generator support according to claim 1, wherein the first fastening region forms a first end region of the gas generator support and the second fastening region forms a second end region of the gas generator support.

13. The gas generator support according to claim 1, wherein it is formed in one piece.

14. A gas generator assembly with a gas generator for inflating a gas bag of a vehicle occupant restraint system and a gas generator support according to claim 1, on which the gas generator is arranged.

15. The gas generator assembly according to claim 14, wherein the gas generator is fixed to the gas generator support.

* * * * *